United States Patent [19]

Perry

[11] 4,391,558
[45] Jul. 5, 1983

[54] DRILL JIG

[76] Inventor: LaRelle T. Perry, 104 30 W. Cut Off, Northboro, Mass. 01532

[21] Appl. No.: 211,505

[22] Filed: Dec. 1, 1980

[51] Int. Cl.³ ............................................. B23B 49/00
[52] U.S. Cl. .................................. 408/110; 144/106; 408/115 R; 408/712; 409/216
[58] Field of Search ............... 408/108, 109, 110, 111, 408/112, 712, 115 R, 241; 409/216; 144/106

[56] References Cited

U.S. PATENT DOCUMENTS

| | | | |
|---|---|---|---|
| 1,207,717 | 12/1916 | Dartt | 408/109 |
| 1,638,086 | 8/1927 | Carter | 409/216 X |
| 2,856,799 | 10/1958 | DeCurtis | 408/712 X |
| 3,362,447 | 1/1968 | Elder, Jr. | 408/109 |
| 3,864,053 | 2/1975 | Harwood | 408/110 |
| 3,874,810 | 4/1975 | Russell | 408/110 X |

Primary Examiner—Z. R. Bilinsky
Attorney, Agent, or Firm—Charles Hieken

[57] ABSTRACT

A drill jig includes a frame adapted for mounting on a work surface, and a guide for guiding a drill bit to various positions on the work surface and along mutually orthogonal axes for boring a hole having its major axis aligned at any desired angle relative to the work surface.

8 Claims, 4 Drawing Figures

DRILL JIG

BACKGROUND OF THE INVENTION

1. Field of the Invention

The present invention relates to portable angularly adjustable drill jigs, and more particularly to drill jigs adapted for directing a drill bit to various positions on the work surface and along mutually orthogonal directions to bore holes in a surface at any angle.

2. Description of the Prior Art

Drill presses and jigs adapted to guide a drill bit attached to a power hand drill toward a work surface to bore holes at a particular angle are well known. Usually the known drill presses and jigs are placed in a fixed position on a surface opposite a work piece. The drill bit is then guided toward and against the work piece and the power drill operated to cause the drill bit to bore a hole in the work piece. Some known drill presses and jigs are arranged to enable the user to drill holes at a desired angle. Examples of angularly adjustable drill presses and jigs are disclosed in U.S. Pat. No. 3,086,408 "Portable Angled Drill Jig" issued to Carl W. Donals on Apr. 23, 1963, U.S. Pat. No. 3,534,639 "Portable Angularly Adjustable Drill Press" issued to Myron D. Treichler on Oct. 20, 1970, U.S. Pat. No. 3,874,810 and U.S. Pat. No. 4,199,283 "Drill Jig" issued to Larelle T. Perry on Apr. 22, 1980. Unfortunately, it is sometimes difficult and inconvenient to bore multiple holes in a work piece since either the work piece or the known drill press must be moved. In addition, it is difficult to accurately bore multiple holes at any angle in more than one plane and separated from one another along a linear path on a work piece without movement of either the work piece or drill press.

Accordingly, it is desired to arrange an apparatus to enable a user to bore holes at different angles and in more than one plane along a linear path on a work piece. Other important and advantageous features of the invention will be apparent from the following description and accompanying drawing, wherein, for purposes of illustration only, a specific form of the invention is set forth in detail.

SUMMARY OF THE INVENTION

A portable drill jig for guiding a drill bit to bore holes in a surface at any preselected compound angle comprises a frame having a bottom surface defining a bottom plane for seating upon the surface. A support member having a planar face is pivotally mounted on the frame for angular displacement in a first plane substantially orthogonal to the planar face. Guide means for guiding the drill bit being linearly displaced relative to the frame in a second plane substantially orthogonal to the planar face of the support member is mounted on the support member for angular displacement in a plane substantially parallel to the planar face of the support member.

DETAILED DESCRIPTION OF PREFERRED EMBODIMENTS

Figure 1:
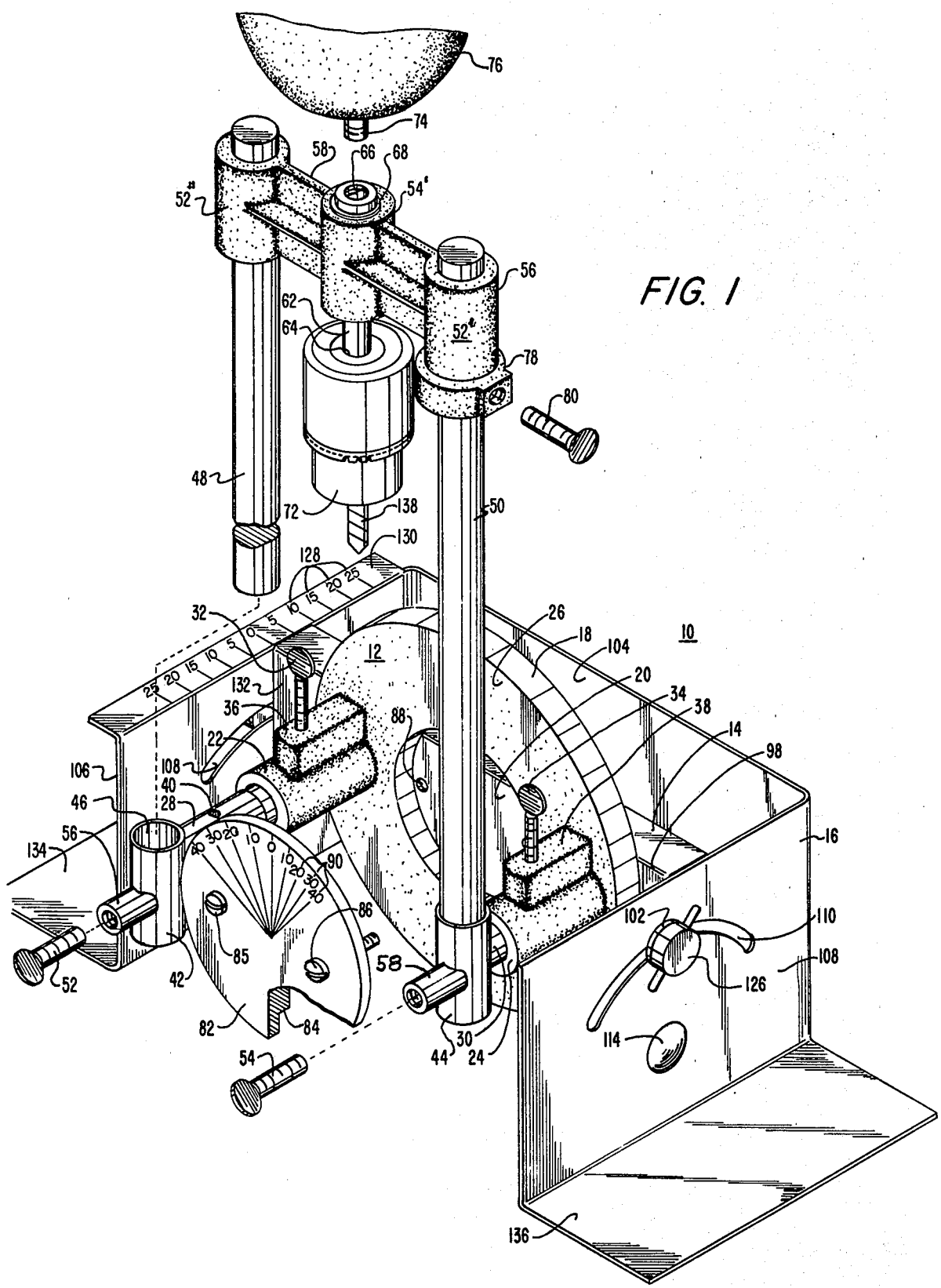
FIG. 1 is an exploded view of a drill jig arranged according to the invention.
Figure 2:
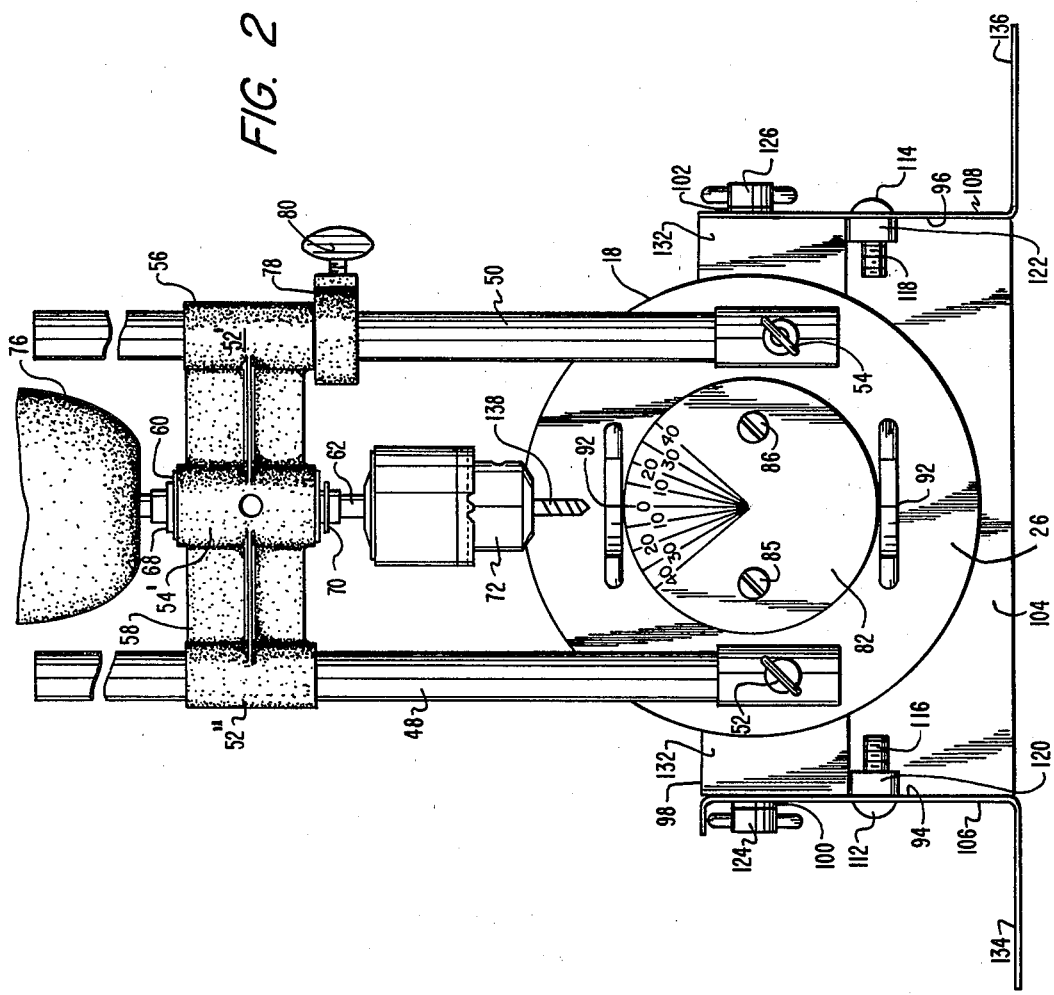
FIG. 2 is a front view of the drill jig.
Figure 3:
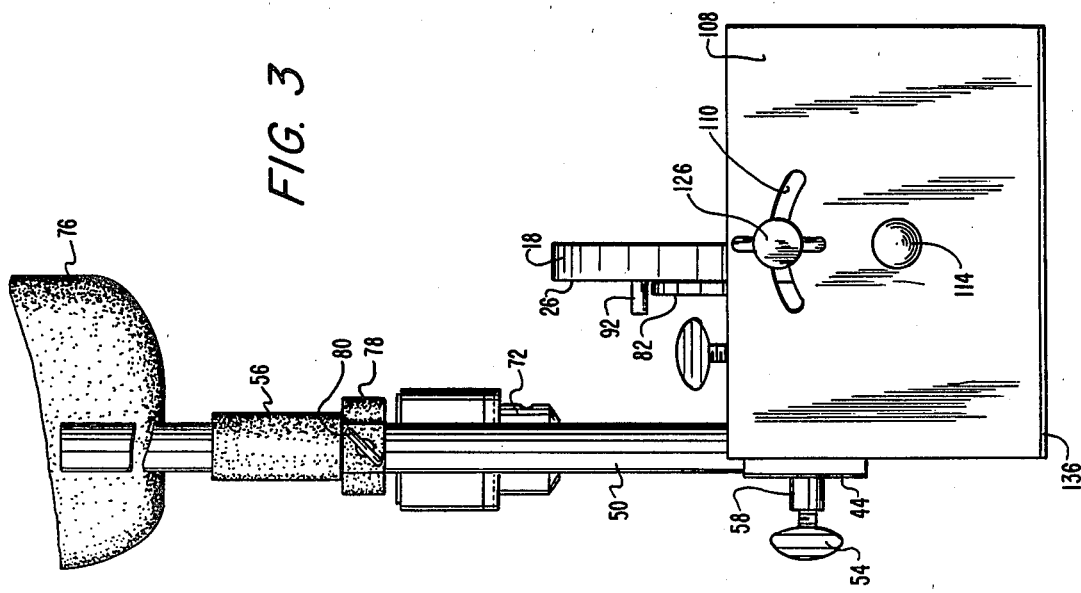
FIG. 3 is a right side view of the drill jig.
Figure 4:
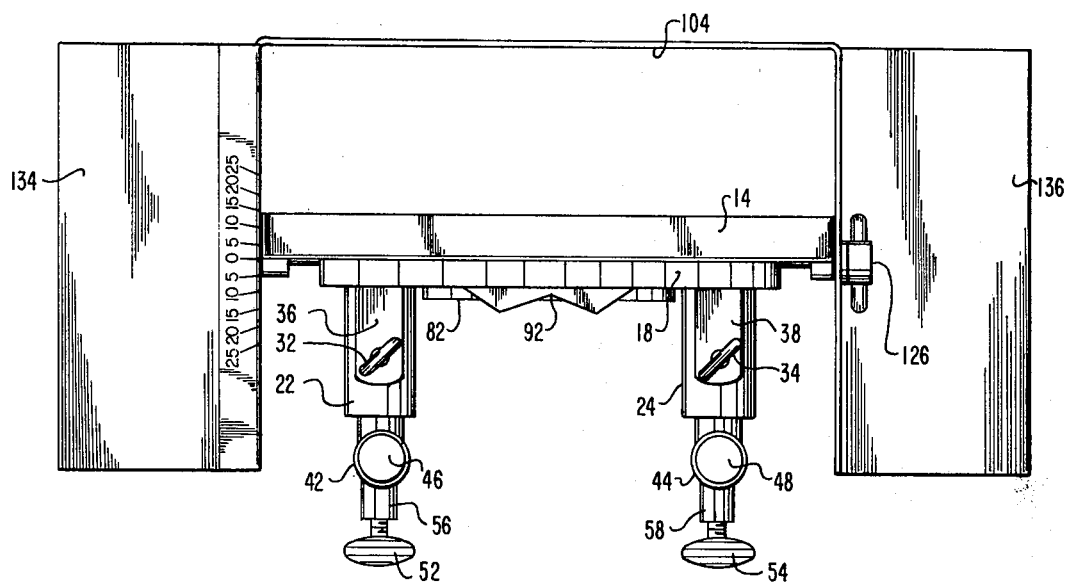
FIG. 4 is a top view of the drill jig with guide posts and drill mount removed.

Referring in detail to the drawing, wherein like numerals designate like parts throughout the several views, the illustrated drill jig 10 comprises a drill guide 12 pivotally mounted on a support member 14 which, in turn, is pivotally attached to a frame 16. Referring to FIGS. 1 and 2, there is shown details of the drill guide 12 including an annular plate 18 having a centrally located circular hole 20 and a pair of tubular posts 22, 24 extending orthogonally from a front face 26 of the plate 18 on opposite sides of the hole 20. The posts 22, 24 may be pressed into position on the plate 18 or the posts 22, 24 and plate 18 may be formed as a unit by known casting techniques. The tubular posts 22, 24 are adapted to receive cylindrical members 28, 30 which telescopically move in and out of the posts 22, 24. Locking screws 32, 34 threadingly engaged with threaded holes in a boss 36, 38 formed on the tubular posts 22, 24 serve to locate and hold the cylindrical members 28, 30 in a preferred position when the screws 32, 34 are advanced against or into holes 40 in the cylindrical members 28, 30.

The cylindrical members 28, 30 each have an end orthoganally joined to a tubular receptacle 42, 44 having a blind hole 46 selected to receive cylindrical guide posts 48, 50. Locking screws 52, 54 threadingly engage with threaded holes in a boss 56, 58 formed on the tubular receptacles 42, 44 serve to hold an end of the guide posts 48, 50 in position at the bottom of the receptacles 42, 44 when the screws 52, 54 are advanced against the guide posts 48, 50. In the preferred embodiment, the cylindrical member 28, 30 and tubular receptacle 42, 44 are formed as a unit by known casting techniques. When in position in the tubular receptacles 42, 44, the guide posts 48, 50 guide a known drill mount 52' toward and away from a work piece, not shown. An example of the drill mount 52 includes first 54', second 56 and third 52" tubular members joined to a cross member 58. The second tubular member 54' has a tubular bearing 60 coaxially pressed into position. A cylindrical arbor extension 62 having a threaded section on one end 64 and a threaded hole 66 on an opposite end is slid into the tubular bearing 60 and loosely held in position by slip rings 68, 70 pressed into annular grooves near the ends of the extension.

In operation, a threaded end of a known drill arbor 72 is twisted onto the threaded end of the arbor extension 62 and a threaded end 74 of a known hand drill 76 is twisted into the threaded hole 66 of the arbor extension 62. The first 52" and third 56 tubular members of the drill mount 52' are slipped onto the guide posts 48, 50, whereby the hand drill 76 and arbor 72 are free to move along the guide posts 48, 50 toward and away from a work piece. An annular ring 78 adapted to slide up and down a guide post 50 between the drill mount 52' and tubular receptacle 44 may be used to limit travel of the drill mount 52' toward the receptacles 42, 44 when locked into position on the guide post 50 by a thumb screw 80. An example of a drill mount 52 is further described in U.S. Pat. No. 3,874,810.

The drill guide 12 is mounted on the support member 14 to pivotally move about the longitudinal axis of the plate hole 20. Means for mounting the drill guide 12 on the support member 14 include a circular disc 82 having an annular lip 84 arranged to coaxially fit within the hole 20 in the plate 18 and press against the front face 26 of the plate 18 when mounting screws 85, 86 are screwed into threaded holes 88 in the support member 14. Indicia 90, 92 may be appropriately inscribed on the circular disc 82 and formed on the front face of the plate 18 to indicate angular position of the drill guide 12 and plate 18 relative to the disc 82 and support member 14.

First and second coaxial throughholes, not shown, are provided near a bottom end of first 94 and second 96 side sections of the support member 14. The holes have an axis which is substantially parallel to a front edge 98 of the support member 14.

First 100 and second 102 coaxial bolt members project outwardly from opposite support member side edges near a top end of the support member 14. The axis of the bolt members 100, 102 is substantially parallel to the axis of the coaxial holes in the support member 14 and the front edge 98 of the support member 14.

Referring to FIGS. 1, 2, 3 and 4, there is shown the frame 16 U-shaped with a back piece 104 suitably fastened or integrally formed with first 106 and second 108 symmetrical side pieces to which the support member 14 is pivotally mounted. The bolt members 100, 102 projecting from the support member 14 are inserted into arcuate shaped throughholes 108, 110 provided in each of the end pieces 106, 108. Smooth surfaces on the bolt members 100, 102 bear against smooth inside surfaces of the holes 108, 110, and threaded sections of the bolt members 100, 102 project through the holes 108, 110.

Means for providing a pivot axis to enable the support member 14 and attached drill guide 12 to pivotally move over an arcuate path in a first plane substantially parallel to the plane of the end pieces 106, 108 include bolt members 112, 114 having a first portion, not shown, with a relatively smooth surface area abruptly joined to a second portion 116, 118 with a reduced cross section and a threaded end. The length of the first portion is slightly longer than the length of the side sections 94, 96 of the support member 14. The bolt members 112, 114 are passed through holes near a bottom edge of the side pieces 106, 108 of the frame 16 and the holes in the side sections of the support member 14. The first portion of the bolt members 112, 114 rest inside the side pieces 106, 108 of the frame 16. The second portion 116, 118 of the bolt members 112, 114 rest inside the holes in the side sections of the support member 14 with the threaded bolt ends projecting beyond the surface of the support member 14. Threaded nuts 120, 122 are twisted onto the threaded ends of the bolts 112, 114 to secure the support member 14 to the frame 16. However, the support member 14 is free to pivotally move on the smooth first portion of the bolt members 100, 102 to a preferred angular position since the length of the smooth first portion is lightly longer than the combined thickness of the side pieces 106, 108 and side sections of the support member 16.

A washer, not shown, and threaded nut 124, 126 is twisted onto the threaded ends of the bolts 100, 102 protruding beyond the side pieces 106, 108 of the frame 16 to lock the support member 14 in a preferred angular position relative to the frame 16. Indicia 128 may be inscribed in a top surface 130 of the side piece 106 to indicate relative angular position of the front edge 98 of the support member 14 in the plane of the frame side pieces 106, 108.

In operation, bottom surfaces 134, 136 of the drill jig 10 are clamped or attached to a bench, table or the work surface itself by screws, clamps, adhesives, or other suitable attaching means. The mounting screws 85, 86 holding the disc 82 against the plate 18 are loosened, and the drill guide 12 is pivotally moved in a plane substantially parallel to a front face 132 of the support member 14 to a first angular position, whereupon the mounting screws are turned to lock the drill guide 12 in the first angular position. If needed, the locking nuts 124, 126 may be loosened and the support member 14 may be pivotally moved in a plane substantially parallel to the plane of the side pieces 106, 108 and orthogonal to the plane of the support member front face 132 to a second angular position, whereupon the locking nuts 124, 126 are tightened.

An end of a drill bit 138 is held in the arbor 72 or chuck of the power hand drill 76. The power hand drill 76 is operated, and the drill bit 138 is pushed downwardly toward the work surface to bore a hole having an axis at a preferred angle relative to the work surface. If the user desires to bore additional holes in the work piece at the same preferred angle, he simply loosens the locking screws 32, 34 and pushes the drill mount 52 toward or away from the front face 132 of the support member 14 to cause the cylindrical members 28, 30 to telescopically move in or out of the posts 22, 24, whereby the drill bit 138 is linearly displaced relative to the frame 16 or moved to a new location to bore a new hole in the work surface.

A preferred embodiment of a drill jig has been shown and described. Various other embodiments and modifications thereof will be apparent to those skilled in the art, and will fall within the scope of invention as defined in the following claims.

What is claimed is:

1. A portable drill jig for guiding a drill bit to bore holes in a surface at any preselected compound angle and supporting said drill bit and a hand drill having a driving shaft with a threaded end and an arbor for supporting said drill bit with a tapped opening for screwably engaging said threaded end for driving said drill bit comprising;
 a frame having bottom surfaces defining a bottom plane for seating upon said surface;
 a support member having a planar face, said support member being pivotally mounted on said frame for angular displacement in a first plane substantially orthogonal to said planar face;
 guide means for guiding said drill bit being linearly displaced relative to said frame in a second plane substantially orthogonal to said planar face of said support member; and
 means for pivotally mounting said guide means on said support member for angular displacement in a plane substantially parallel to said planar face of said support member,
 said guide means comprising arbor extension means threaded at one end for screwably engaging the tapped opening of said arbor and tapped at the other end for screwably engaging the threaded end of said driving shaft and bearing means for rotatably supporting said arbor,
 whereby linear displacement of said guide means relative to said frame with said arbor extension means screwably engaging said arbor and said drive shaft allows said drill bit to drill a hole in said surface at any preselected compound angle related to the angular displacement of said support member in said first plane and the angular displacement of said guide means in said plane substantially parallel to said planar face of said support member.

2. A portable drill jig in accordance with claim 1, wherein said frame is U-shaped with a back piece integrally formed with first and second side pieces.

3. A portable drill jig in accordance with claim 2, wherein said side pieces have arcuately shaped holes.

4. A portable drill jig in accordance with claim 3, wherein said support member includes first and second bolt members for pivotally mounting opposite ends of said support members to said side pieces to form a pivot axis for said angular displacement of said support member and locking members extending through said arcuately shaped holes in said side pieces for locking said support member in a preferred angular position in said first plane.

5. A portable drill jig in accordance with claim 1, wherein said guide means include a plate having a planar surface and first tubular members mounted substantially orthogonal to said planar surface, and second L-shaped tubular members carrying said drill bit; said second tubular members being adapted to telescopically move in and out of said first tubular members for guiding said drill bit toward and away from said planar surface.

6. A portable drill jig in accordance with claim 5, wherein said means for mounting said guide means to said support member include a disc adapted to press said plate against said support member.

7. A portable drill jig in accordance with claim 1 wherein said guide means include a plate having a planar surface,
first and second parallel members interconnected by a cross member therebetween,
said cross member supporting said bearing means and said arbor extension means,
and means for slidably supporting said cross member on said first and second members in a plane parallel to and spaced from the planar surface of said plate for guiding said drill bit toward and away from said planar surface to allow said drill bit to drill a hole in said surface at any preselected compound angle.

8. A portable drill jig in accordance with claim 7 wherein the latter means comprises tubular hollow posts attached and orthogonal to said plate receiving cylindrical members each carrying tubular receptacles supporting respective ones of said first and second members.

* * * * *